United States Patent
Kussmaul et al.

(10) Patent No.: US 10,956,430 B2
(45) Date of Patent: Mar. 23, 2021

(54) USER-DRIVEN ADAPTATION OF RANKINGS OF NAVIGATION ELEMENTS

(71) Applicant: International Business Machines Corporation, Armonk, NY (US)

(72) Inventors: Timo Kussmaul, Boeblingen (DE); Uwe K. Hansmann, Tuebingen (DE); Kai Brennenstuhl, Boeblingen (DE); Andreas Prokoph, Boeblingen (DE); Thomas Steinheber, Maihingen (DE)

(73) Assignee: International Business Machines Corporation, Armonk, NY (US)

(*) Notice: Subject to any disclaimer, the term of this patent is extended or adjusted under 35 U.S.C. 154(b) by 65 days.

(21) Appl. No.: 16/384,975

(22) Filed: Apr. 16, 2019

(65) Prior Publication Data

US 2020/0334260 A1     Oct. 22, 2020

(51) Int. Cl.
    G06F 3/048       (2013.01)
    G06F 16/2457     (2019.01)
    G06F 3/0486      (2013.01)
    G06F 9/451       (2018.01)

(52) U.S. Cl.
    CPC ...... *G06F 16/24578* (2019.01); *G06F 3/0486* (2013.01); *G06F 9/451* (2018.02); *G06F 16/24573* (2019.01)

(58) Field of Classification Search
    CPC ............. G06F 3/0486; G06F 15/24573; G06F 15/24578
    See application file for complete search history.

(56) References Cited

U.S. PATENT DOCUMENTS

| 7,689,580 B2 | 3/2010 | Wang |
| 7,895,181 B2 | 2/2011 | Shaw |
| 8,793,573 B2 | 7/2014 | Beckmann |
| 8,832,076 B2 | 9/2014 | Gutlapalli |

(Continued)

FOREIGN PATENT DOCUMENTS

| JP | 2004112318 A | 4/2004 |
| JP | 4042100 B2 | 2/2008 |
| WO | 0119017 A1 | 3/2001 |

OTHER PUBLICATIONS

"Amazon Cloudsearch", 7 pages, Jul. 3, 2018, copyright 2018, Amazon Web Services, <https://aws.amazon.com/cloudsearch/>.

(Continued)

*Primary Examiner* — Claudia Dragoescu
(74) *Attorney, Agent, or Firm* — Alexander G. Jochym

(57) ABSTRACT

The invention relates to a method for implementing user-driven adaptation of a ranking of navigation elements of a client application. The navigation elements are provided for use by the client application as part of search results in reply to search queries issued by the client application. A search service executes search queries, a ranking infrastructure provides a ranking model for ranking search results as well as a ranking training component for updating the ranking model. The user-driven adaptation is received from a navigation adaptation component of the client application and used by a ranking adaptation component of the search service for updating the training data. The ranking adaptation component invokes the ranking training component to calculate an updated ranking model using the updated training data.

19 Claims, 7 Drawing Sheets

(56) References Cited

U.S. PATENT DOCUMENTS

| | | | |
|---|---|---|---|
| 9,098,497 | B1 | 8/2015 | Brette |
| 9,213,749 | B1* | 12/2015 | Collins .................. G06F 16/248 |
| 9,361,317 | B2 | 6/2016 | Lightner |
| 9,563,621 | B2 | 2/2017 | Halme |
| 9,697,016 | B2 | 7/2017 | Jacob |
| 9,697,258 | B2 | 7/2017 | Barton |
| 9,734,518 | B2 | 8/2017 | Suleman |
| 2008/0208808 | A1 | 8/2008 | Sue |
| 2010/0145896 | A1* | 6/2010 | Yuta ........................ G16C 20/30 706/12 |
| 2012/0078874 | A1 | 3/2012 | Gonzalez |
| 2014/0358887 | A1 | 12/2014 | Morris |
| 2015/0026639 | A1* | 1/2015 | Nakamura ............ G06F 3/0486 715/821 |
| 2015/0161255 | A1* | 6/2015 | Battle .................. G06F 16/9535 707/706 |
| 2015/0309698 | A1 | 10/2015 | Senderek |
| 2017/0147580 | A1* | 5/2017 | Buchmann ........ G06F 16/24578 |
| 2017/0169111 | A1 | 6/2017 | Baum |
| 2017/0201523 | A1 | 7/2017 | Palmer |
| 2017/0220605 | A1 | 8/2017 | Nivala |
| 2017/0357725 | A1 | 12/2017 | Hornkvist |
| 2018/0121556 | A1 | 5/2018 | Badros |
| 2020/0104305 | A1* | 4/2020 | Wei ...................... G06F 16/9536 |

OTHER PUBLICATIONS

"Autoregressive model", From Wikipedia, the free encyclopedia, Last edited Mar. 28, 2019, <https://en.wikipedia.org/wiki/Autoregressive_model>.

"'Bayes' theorem", From Wikipedia, the free encyclopedia, Last edited on Mar. 16, 2019, <https://en.wikipedia.org/wiki/Bayes_theorem>.

"Bayesian inference", From Wikipedia, the free encyclopedia, Last edited on Mar. 29, 2019, <https://en.wikipedia.org/wiki/Bayesian_inference>.

"Bayesian probability", From Wikipedia, the free encyclopedia, Last edited on Feb. 23, 2019, <https://www/en.wikipedia.org/wiki/Bayesian_probability>.

"Bayesian statistics", From Wikipedia, the free encyclopedia. Last edited on Apr. 12, 2019, 4 pages, https://en.wikipedia.org/wiki/Bayesian_statistics#cite_note-bda-1>.

"Conditional probability", From Wikipedia, the free encyclopedia, Last edited on Mar. 18, 2019, <https://en.wikipedia.org/wiki/Conditional_probability>.

"Errors and residuals", From Wikipedia, the free encyclopedia, last edited Dec. 28, 2018, <www.https://en.wikipedia.org/wiki/Erros_and_residuals>.

"Event (probability theory)", From Wikipedia, the free encyclopedia, Last edited on Mar. 25, 2019, <https://en.wikipedia.org/wiki/Event_(probability_theory)>.

"Frequentist probability", From Wikipedia, the free encyclopedia, Last edited on Mar. 14, 2019, <https://en.wikipedia.org/wiki/Frequentist_probability>.

"George E.P. Box", From Wikipedia, the free encyclopedia, Last edited on Mar. 29, 2019, <www.https://en.wikipedia.org/wiki/George_E._P._Box>.

"Gwilym Jenkins", From Wikipedia, the free encyclopedia, Last edited on Jan. 12, 2017, <www.https://en.wikipedia.org/wiki/Gwilym_Jenkins>.

"Headless Crawling", 2 pages, printed Jul. 3, 2018, copyright 2017 Ryte, <https://en.ryte.com/wiki/Headless_Crawling>.

"JaSpell::Java Spelling Checking Package", SourceForge, 2004 copyright Bruno Marins—XLDB Group, Apr. 12, 2019, 1 page, <http://jaspell.sourceforge.net/>.

"Limit of a sequence", From Wikipedia, the free encyclopedia, Last edited on Feb. 6, 2019, <https://en.wikipedia.org/wiki/Limit_of_a_sequence>.

"Linear combination", From Wikipedia, the free encyclopedia, Last edited Oct. 22, 2018, <https://en.wikipedia.org/wiki/Linear_combination>.

"Moving-average model", From Wikipedia, the free encyclopedia, Last edited on Dec. 8, 2018, <https://en.wikipedia.org/wiki/Moving-average-model>.

"Open-Source Content Management Systems Lack Security", 5 pages, Aug. 25, 2018, <https://expert.services/blog/managing-your-website/security/hacking-open-source-cms.html>.

"Peter Whittle (mathematician)", From Wikipedia, the free encyclopedia, Last Edited on Feb. 27, 2019, <https://en.wikipedia.org/wiki/Peter_Whittle_(mathematician)>.

"Probability distribution", From Wikipedia, the free encyclopedia, Last edited on Mar. 29, 2019, <https://en.wikipedia.org/wiki/Probability_distribution>.

"Probability interpretations", From Wikipedia, the free encyclopedia, Last edited on Feb. 28, 2019, <https://en.wikipedia.org/wiki/Probability_interpretations>.

"Probability", From Wikipedia, the free encyclopedia, Last Edited on Mar. 18, 2019, <https://en.wikipedia.org/wiki/Probability>.

"Stationary process", From Wikipedia, the free encyclopedia, Last edited on Mar. 15, 2019, <https://en.wikipedia.org/wiki/Stationary_process>.

"Statistical model", From Wikipedia, the free encyclopedia, Last edited on Apr. 1, 2019, <https://en.wikipedia.org/wiki/Statistical_model>.

"Statistics", From Wikipedia, the free encyclopedia, Last edited on Mar. 29, 2019, <https://en.wikipedia.org/wiki/Statistics>.

"The making of ERS 2.0—Getting Started with Cloud CMS", 17 pages, 2017, The Headless Meet Cloud CMS, <https://www.google.com/url?sa=t&rct=j&q=&esrc=s&sou rce=web&cd=1&ved=0ahUKEwj-plSd85bcAhWDfisKHYqbBa4QFggnMAAA&url=https%3A%2F%2Fwww.cloudcms.com%2Fdownloads%2Fpdfs%2FThe_Making_of_ERS.pdf&usg=AOvVaw1A17jUjRveK-5zAixyNjus>.

"Time series", From Wikipedia, the free encyclopedia, Last edited on Mar. 13, 2019, <https://en.wikipedia.org/wiki/Time_series>.

Adhikari, et al., "An Introductory Study on Time Series Modeling and Forecasting", 67 pages, <https://arxiv.org/ftp/arxiv/papers/1302/1302.6613.pdf>.

Cleveland, et al., "STL: A Seasonal-Trend Decomposition Procedure Based on Loess", journal of Official Statistics, vol. 6, No. 1, 1990, pp. 3-73, <https://www.wessa.net/download.stl.pdf>.

Exalead, "Search-Based Applications (SBAs)", Exalead Solutions Brief: Search-Based Applications (SBAs), v1.1 © 2010 Exalead, pp. 1-8.

Kauffman, "A Better Authoring Experience for Headless CMS's", Mar. 7, 2018, pp. 1-4, <https://www.bloomreach.com/en/blog/2018/03/a-better-authoring-experience-for-headless-cms%E2%80%99s.html>.

Mell et al., "The NIST Definition of Cloud Computing", Recommendations of the National Institute of Standards and Technology, Special Publication 800-145, Sep. 2011, 7 pages.

Rack Blogger, "Content Management System Comparison: Performance Optimization", Jan. 20, 2011, The Official Rackspace Blog, 3 pages, <https://blog.rackspace.com/content_management_system_comparison_performance_optimization>.

Whittle, Peter, "Hypothesis testing in time series analysis", Uppsala, Almqvist & Wiksells boktr. 1951, 120 pages, <https://www.worldcat.org/title/hypothesis-testing-in-time-series-analysis/oclc/22153644>.

Kussmaul, "Improved Navigation Paths Between Content Items", U.S. Appl. No. 16/384,977, filed Apr. 16, 2019.

Kussmaul, et al., "Automatic Adaption of a Search Configuration", U.S. Appl. No. 16/384,973, filed Apr. 16, 2019.

Kussmaul, et al., "Automatic Check of Search Configuration Changes", U.S. Appl. No. 16/384,974, filed Apr. 16, 2019.

Kussmaul, et al., "Managing Search Queries of a Search Service", U.S. Appl. No. 16/384,979, filed Apr. 16, 2019.

Kussmaul, et al., "Personalizing a Search of a Search Service", U.S. Appl. No. 16/384,981, filed Apr. 16, 2019.

Kussmaul, et al., "Preventing Search Fraud", U.S. Appl. No. 16/384,978, filed Apr. 16, 2019.

(56) References Cited

OTHER PUBLICATIONS

List of IBM Patents or Patent Applications Treated as Related, Appendix P, Filed Herewith.

* cited by examiner search-query-page-001:MENU~119277=10,MENU~1560=9,MENU~1520=8,LINK~1521=7
search-query-page-002:MENU~4456=10,MENU~1860=9,LINK~1720=8,LINK~1511=7
search-query-page-003:MENU~219278=12,MENU~21560=10,MENU~31521=8,MENU~1571=3
                                                                      ~130

Fig. 7A search-query-page-001:MENU~1520=20,MENU~119277=10,MENU~1560=9,LINK~1521=7
search-query-page-002:MENU~4456=10,MENU~1860=9,LINK~1720=8,LINK~1511=7
search-query-page-003:MENU~219278=12,MENU~21560=10,MENU~31521=8,MENU~1571=3
                                                                       ~130

Fig. 7B

USER-DRIVEN ADAPTATION OF RANKINGS OF NAVIGATION ELEMENTS

BACKGROUND

The present disclosure relates to the field of electronic data processing and, more specifically, to implement a user-driven adaptation of a ranking of navigation elements of a client application.

Client applications, also referred to as search-based applications, may rely on a search service to identify and retrieve information that is required for the functionality of the client application, like content and navigation elements. The client application sends during runtime search queries to the search service and retrieves the information that is required, e.g., for rendering application views from search results of the search queries. The application views present the content and the navigation elements retrieved from the search service to a user of the client application.

SUMMARY

Various embodiments provide a method for implementing a user-driven adaptation of a ranking of navigation elements of a client application as well as a computer program product and a computer system for executing the method as described by the subject matter of the independent claims. Advantageous embodiments are described in the dependent claims. Embodiments of the present invention can be freely combined with each other if they are not mutually exclusive.

In one aspect, the invention relates to a method for implementing a user-driven adaptation of a ranking of navigation elements of a client application. The navigation elements are provided for use by the client application as part of search results in reply to search queries issued by the client application. The search results further each define a sequence of the navigation elements comprised by the respective search result depending on the ranking of the navigation elements. A search service is provided with a search engine for executing the search queries issued by the client application using a search index with content items. The content items comprise the navigation elements.

The search service further comprises a ranking infrastructure comprising a ranking model and a ranking training component. The ranking model is used for ranking search results of search queries. The ranking training component is configured for calculating the ranking model using training data accessible by the ranking training component. The training data comprises a set of sample search queries, a set of sample search results comprising a sample search result for each of the sample search queries, and a set of sample ranking metrics comprising a sample ranking metric for each of the sample search results. Each sample ranking metric defines a ranking for the respective sample search result. Further a ranking adaptation component is provided for adapting one or more sample ranking metrics of the training data using one or more user-driven adaptations of the ranking of the navigation elements.

The method comprises receiving by the ranking adaptation component a definition of the one or more user-driven adaptation from a navigation adaptation component of the client application. The definition of the user-driven adaptation identifies one or more changes of a sequence of the navigation elements performed by a user of the client application. The ranking adaptation component determines using the training data one or more sample ranking metrics assigned to sample search results of sample search queries related to the received user-driven adaptation of the ranking of the navigation elements. The ranking adaptation component updates the determined sample ranking metrics, wherein the updating comprises calculating updated ranking metrics using the changes of the sequence of the navigation elements. The ranking adaptation component further updates the training data with the updated ranking metrics and invokes the ranking training component to calculate an updated ranking model using the updated ranking metrics.

In a further aspect, the invention relates to a computer program product comprising a non-volatile computer-readable storage medium having computer-readable program code embodied therewith for implementing a user-driven adaptation of a ranking of navigation elements of a client application. The navigation elements are provided for use by the client application as part of search results in reply to search queries issued by the client application. The search results further each define a sequence of the navigation elements comprised by the respective search result depending on the ranking of the navigation elements. A search service is provided with a search engine for executing the search queries issued by the client application using a search index with content items. The content items comprise the navigation elements.

The search service further comprises a ranking infrastructure comprising a ranking model and a ranking training component. The ranking model is used for ranking search results of search queries. The ranking training component is configured for calculating the ranking model using training data accessible by the ranking training component. The training data comprises a set of sample search queries, a set of sample search results comprising a sample search result for each of the sample search queries, and a set of sample ranking metrics comprising a sample ranking metric for each of the sample search results. Each sample ranking metric defines a ranking for the respective sample search result. Further a ranking adaptation component is provided for adapting one or more sample ranking metrics of the training data using one or more user-driven adaptations of the ranking of the navigation elements.

The implementing of the user-driven adaptation of the ranking of the navigation elements comprises receiving by the ranking adaptation component a definition of the one or more user-driven adaptation from a navigation adaptation component of the client application. The definition of the user-driven adaptation identifies one or more changes of a sequence of the navigation elements performed by a user of the client application. The ranking adaptation component determines using the training data one or more sample ranking metrics assigned to sample search results of sample search queries related to the received user-driven adaptation of the ranking of the navigation elements. The ranking adaptation component updates the determined sample ranking metrics, wherein the updating comprises calculating updated ranking metrics using the changes of the sequence of the navigation elements. The ranking adaptation component further updates the training data with the updated ranking metrics and invokes the ranking training component to calculate an updated ranking model using the updated ranking metrics.

In a further aspect, the invention relates to a computer system for implementing a user-driven adaptation of a ranking of navigation elements of a client application. The navigation elements are provided for use by the client application as part of search results in reply to search queries issued by the client application. The search results further each define a sequence of the navigation elements comprised by the respective search result depending on the ranking of the navigation elements. A search service is provided by the computer system with a search engine for executing the search queries issued by the client application using a search index with content items. The content items comprise the navigation elements.

The search service further comprises a ranking infrastructure comprising a ranking model and a ranking training component. The ranking model is used for ranking search results of search queries. The ranking training component is configured for calculating the ranking model using training data accessible by the ranking training component. The training data comprises a set of sample search queries, a set of sample search results comprising a sample search result for each of the sample search queries, and a set of sample ranking metrics comprising a sample ranking metric for each of the sample search results. Each sample ranking metric defines a ranking for the respective sample search result. Further a ranking adaptation component is provided by the computer system for adapting one or more sample ranking metrics of the training data using one or more user-driven adaptations of the ranking of the navigation elements.

The computer system comprises a processor and a memory storing machine-executable program instructions. Executing the program instructions by the processor causes the processor to control the computer system to receive by the ranking adaptation component a definition of the one or more user-driven adaptation from a navigation adaptation component of the client application. The definition of the user-driven adaptation identifies one or more changes of a sequence of the navigation elements performed by a user of the client application. The ranking adaptation component determines using the training data one or more sample ranking metrics assigned to sample search results of sample search queries related to the received user-driven adaptation of the ranking of the navigation elements. The ranking adaptation component updates the determined sample ranking metrics, wherein the updating comprises calculating updated ranking metrics using the changes of the sequence of the navigation elements. The ranking adaptation component further updates the training data with the updated ranking metrics and invokes the ranking training component to calculate an updated ranking model using the updated ranking metrics.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

Figure 1:
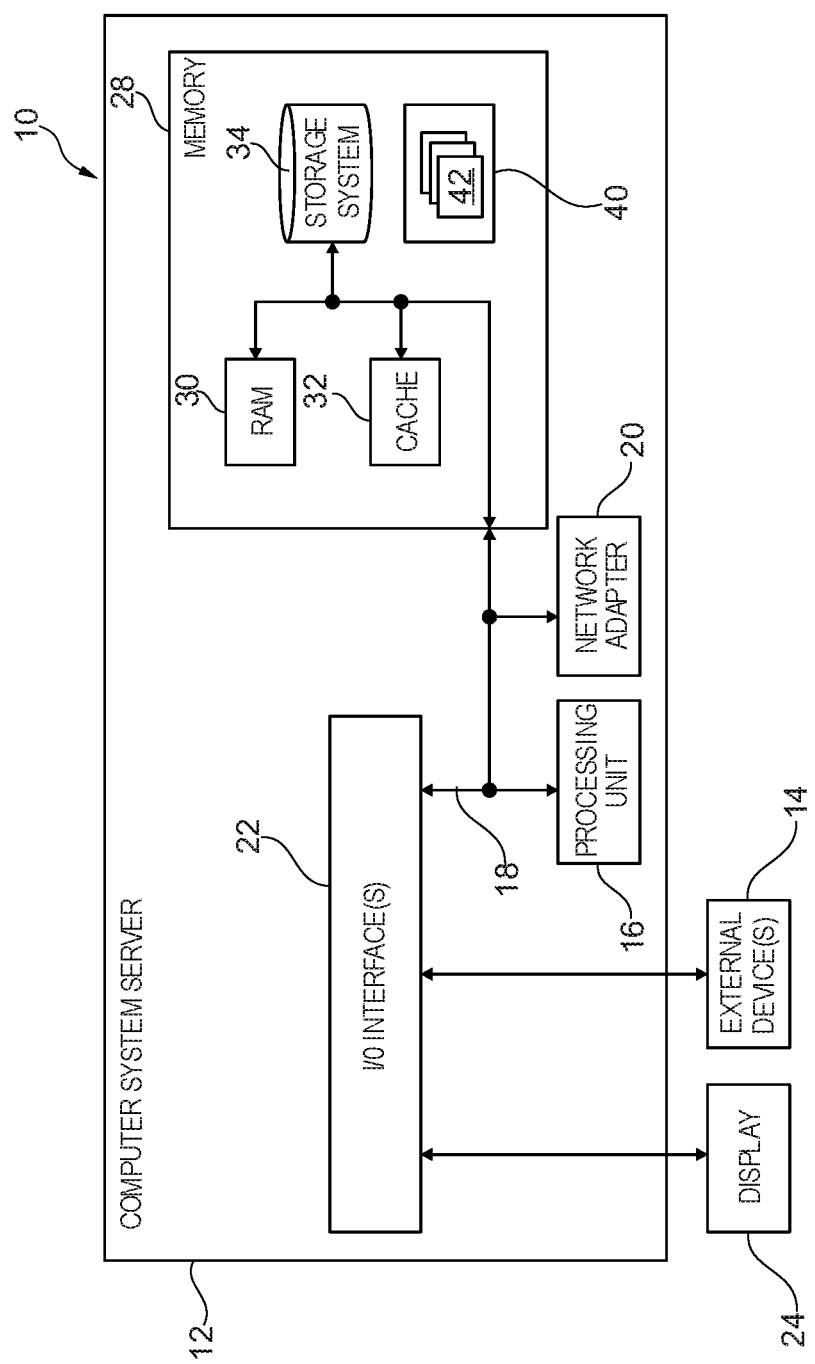
FIG. 1 depicts a schematic diagram illustrating an exemplary cloud computing node according to an embodiment.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments may have the beneficial effect that a ranking of navigation elements may be adapted to user preferences and needs. A user may initiate changes of a sequence of navigation elements. The respective navigation elements may be presented to the user by a client application, more precisely a search-based client application, as part of an application view. The selection and order of the navigation elements presented to the user may be defined by a search result of a search query issued by the search-based application. During runtime the search-based application may send search queries to a search service for executing search queries received from the search-based application. Thereby, the search service may provide information that is required for the functionality of the client application, like content and navigation elements. According to embodiments, the search service may be comprised by a content management service managing the information required for the functionality of the client application, e.g., as content items. For providing the respective information from the search service, search queries issued by the client application and search results provided by the search service in response to the search queries may be used. The application views present the content and the navigation elements retrieved from the search service in form of search results to a user of the client application. The user may use the navigation elements to navigate through the client application, e.g., switching between application views.

Embodiments enable the content management service which manages the navigation elements to define the ranking and thus the sequence in which navigation elements are provided for the user in a way that satisfies the users preferences, expectations and needs. Thus, the user experience of the client application may be improved. For example, navigation elements may be provided in a sequence starting with navigation elements most relevant for the user. Navigation elements with the highest probability of usage by the user may be provided in a way that the user can easily find and use them. Thus, usability of the search-based application may be improved.

Embodiments may enable to calculate an updated ranking model depending on user-driven adaptation of the ranking of navigation elements and provided for retrieving navigation elements. Thus, the ranking of the navigation elements retrieved may be modified such that search results can be determined taking into account user defined amended structures and/or sequences of navigation elements, like an amended sequence of menu items.

Embodiments may have the beneficial effect to provide a method which enables a user of a search-based application to adapt and/or extend the respective application. In particular, a navigation presented by the application may be adapted and/or extended. For this purpose, the user may, e.g., drag and drop navigation elements, like menu items or elements representing links between various pages or views of the application. Thus, a sequence of navigation elements provided by the content management system may be rearranged by the user according to individual user-preferences and needs.

By modifying the ranking of the navigation elements, a user experience of the application may directly be influenced without requiring a code change in the search-based application program. The user experience may, e.g., be influenced by providing a modified sequence of menu items, navigation elements, etc. displayed in a user interface (UI) of the client application.

Embodiments may have the beneficial effect of allowing to improve a ranking based on user-driven adaptation, like drag and drop operations executed by the user. An existing ranking of navigation elements may be enhanced by including additional automatically generated information in the training data and training an updated version of the ranking model using the training data updated with the additional automatically generated information. Embodiments may have the beneficial effect of enhancing rather than replacing a given ranking model which may be based on a set of given features. The previous ranking is not replaced, but rather enhanced and/or personalized taken into account user-driven adaptation. Embodiments may rely on the fact that by using learning-to-rank (LTR) enhanced training data may generally result in an improved ranking model.

Embodiments may thus provide an enhanced user experience of a search-based application program, improve user confidence and user productivity as well as lower efforts required for maintenance and support. According to embodiments the method may work automatically and without requiring modifications and/or code changes in the client application, i.e., search-based application.

In a service-oriented software architecture, a service refers to a software component which provides an application programming interface (API) configured to be accessible or invokable by other services or software components using a standard protocol or a standard invocation mechanism. A service may be implemented, created, removed, deployed, started and stopped independently of other services.

An API refers to a set of predefined methods of communication among software components. An API may comprise a set of subroutine definitions, communication protocols, and/or tools for building software. Thus, an API may provide a set of building blocks which may be combined for developing computer programs. An API specification defining an API may, e.g., comprise specifications for routines, data structures, object classes, variables, an/or remote calls.

In a service infrastructure, multiple instances of one service may be running in order to improve fault tolerance, throughput and load balancing of service requests. Each of the instances of the service may provide the same APIs and the same functionality. Each of the instances may be based on the same implementation, e.g. code, docker image and/or deployment artefact.

An interaction of a first service with a second service may comprise sending a service request for invoking an operation of one of the APIs provided by the second service. A service request may comprise an identifier of the requested API operation, e.g., in form of an URL or another parameter. In addition, a service request may comprise further data relevant for processing the service request.

A service infrastructure may comprise at least one service registry providing functionality for a service discovery and/or service lookup. A service registry may manage information about active, i.e., running, services of the service infrastructure. Before a first service invokes a second service, the first service may send a lookup request to the service registry containing a set of one or more criteria for selecting the second service, such as a service name and/or service identifier. A service name may be hardcoded in an implementation of the first service. Upon receipt of the lookup request, the service registry may select a service instance which adheres to the specified one or more criteria specified by the lookup request and return information about the selected service instance to the first service. The respective information may comprise an address, e.g., an URL, hostname, IP address and/or port, for use by the first service to create and send an invocation request to the second service. In case there is no service satisfying the one or more criteria specified by the lookup request, the service registry may return an error message.

A service registry may maintain information about a status and/or health of each service instance and consider only healthy services for service discovery requests, i.e., service lookup requests. In case a service instance becomes unresponsive and/or unhealthy, the service registry may no longer provide an address and/or information about the respective service instance to other services. The service registry may further incorporate a load balancing algorithm for distributing load between service instances, e.g. using random choice, round robin, and/or least connections.

A service may register at the service registry, e.g., immediately after starting. The registering may for example comprise sending a registration request including an address of the service to be registered. The registration request may further comprise data like, e.g., a service identifier and/or a set of identifiers of one or more APIs provided by the service to be registered. The service registry may, e.g., regularly, invoke a health check, e.g., in form of a status request, on each registered service. The invoked service may respond by returning status information. The status information may, e.g., comprise a flag indicating whether the respective service is healthy or unhealthy. If the returned status indicates a problem or if a service does not respond in time, the service registry may flag the respective service as unhealthy.

According to embodiments, a service registry may select a service instance based on two simple criteria: a binary flag representing a health status of the respective service and a service identifier, like, e.g., a service name.

A services infrastructure may be built using cloud computing. A computing component of the cloud may be separated from the Internet, e.g., by a firewall. An API gateway may provide access to client applications, i.e., client application programs, like mobile applications executed on a mobile communication device, e.g., a smartphone, to desktop applications executed on desktop computers, scripts executed in a browser, etc. An API gateway may receive requests issued by client applications and create a service lookup requests using the client requests. The service lookup requests may be sent to the service registry by the API gateway. In response to sending the service lookup requests, the API gateway may receive one or more addresses of service instances to be invoked and send invocation requests to the respective service instances. In response to sending the invocation requests, the API gateway may receive responses from the respective service instances and create one or more responses to the client request using the responses received from the service instances. The responses created by the API gateway may be returned to the requesting client applications.

While processing a request received from an API Gateway, a service instance may need to invoke another service. For this purpose, the service instance may prepare a lookup request, send the prepared lookup request to a service registry, receive in response to sending the lookup request an address of a service instance and invoke the respective service instance using the received address.

Services may use state of the art software engineering mechanisms, like e.g. caching, persistent storage, session and state management, connection and thread pooling, etc. For example, caching may improve performance. A computer system may cache, i.e., store in a cache memory, data that was recently used, e.g. while processing recent requests. Since requests may be distributed between service instances, individual service instances may have different cache entries. In other words, the state of a service instance may depend on an individual usage history of the respective service instance. Service performance may depend on whether data relevant for processing a request is available in a cache memory assigned to the respective service or not. Thus, service performance for processing the same request may differ between individual service instances. It is therefore preferable to intelligently select service instances for processing a request.

A service performance may depend heavily on the data in a cache memory assigned to the respective service. However, there may be no standard for sharing detailed information about cache contents between service instances and service registries. Thus, this information may not be available during service lookup, e.g., for selecting a particular service instance.

A service infrastructure and a service implemented therein, like, e.g., a search service, may serve multiple users and multiple tenants. A tenant refers to a group of users, e.g., a company, who share a common access with specific privileges to a software instance, i.e. service instance. The service infrastructure and implemented service may ensure that tenant specific data assigned to a particular tenant is isolated from other tenants. Client requests and service requests may comprise a tenant identification identifying a tenant which is associated with the respective requests. The tenant identification may enable the service infrastructure component to establish a context and state required for processing the respective requests.

According to embodiments, the navigation elements are managed by a content management system comprising the search service and managing the content items of the search index, wherein the content management system further comprises the ranking adaptation component. Thus, the search service may be implemented as part of a content management system.

A content management system (CMS) may manage a creation of digital content items, such as text documents, web pages, images, videos, code scripts, etc. A content management system may support multiple users in a collaborative environment. Modern enterprise-scale content management systems may be based on separate content authoring and content delivery systems. Thereby, different requirements of content creation and retrieval tasks may be met. A process responsible for creating, modifying and editing content may take place in the authoring system and be referred to as authoring. A process responsible for transferring content from the authoring system to the delivery system may be referred to as publishing. A content is either transferred as it is, e.g., text, video, images, static files, or in a transformed formed, e.g., pre-render templates.

A content management system may provide an authoring user interface for editing and managing content items. A content management system may be configured as a headless CMS, i.e., may not provide a visual user interface, but rather provide a set of APIs, which may be called by client applications to create, edit and retrieve content items.

This may allow a client application to provide a user interface and functionality for content authoring as well as to invoke APIs to create, edit and retrieve content items.

An authoring system may allow content authors to create, edit and manage content items. The authoring system may include an authoring user interface or may just provide authoring APIs. Furthermore, the authoring system may allow to upload or import files.

A content management system may further provide a publishing system configured for publishing content items from the authoring system to a delivery system or component, like a content delivery network (CDN), to make the content available to the public. The publishing system may also incorporate further functionalities, like indexing content items in a search index, modifying, transforming or prerendering content items, etc. Publishing may be started manually by a content author, may be invoked on schedule or may be invoked via a publishing API operation.

A content management system may provide a functionality to define different types of content items. For example, the content management system may provide a predefined list of possible content item types. The type of a content item may, e.g., be selected by the user using an authoring system or component. The content management system may represent and store the content item type as a specific field in the content item. The respective field may, e.g., be named "type" or "classification". For example, a content management system may provide the following predefined content item types: "content", "asset", "page", "page template". A content management system and client applications, which retrieve and use the content items, may handle content items of different type separately. For example, a client application may use a first content item of type "page" to render a view of a page.

A content management system may be deployed in a cloud environment and implemented as a set of interacting services. An API gateway may provide an API to application programs, like, e.g., client application, authoring application, etc. and forward requests and responses between the respective applications and the services provided by the content management system.

A content management system may comprise a search service component or may alternatively use a search service external to the content management system. An authoring system may allow content authors to search for content items, a publishing system may index published content items in a delivery search index, thereby allowing client applications to search for content. The authoring system may index content items in an authoring index, when a content item is created, updated or deleted. The publishing system may index content items during publishing. As part of publishing, the publishing system may further update a configuration of the search index and invoke a learning to rank method in a training mode in order to recalculate a ranking model.

End users may rely on a search service to find a certain content in the web site, like, e.g., products in a web shop. Furthermore, content management system client applications may use the search to lookup content to be rendered and content for establishing, e.g., a page hierarchy for navigation. Therefore, search quality and relevance ranking of search results may be important for end users as well as for an operator of a web site.

A search service may provide functionality for searching in unstructured data, like e.g. text documents. For this purpose, a search service provides functionality to create a search index by indexing content items, i.e. data to be searched, like e.g. text documents. A search index may contain a representation of a data content to be searched, in a representation which is suited, e.g. improved, for processing by the search service. The search service may provide an application programming interface API for indexing content items, which makes the respective content items searchable by the search service. Further the search service may provide a query API allowing a client, e.g. another service or an application, to issue a search query. A search query may contain a set of query parameters specifying search criteria for searching content items, like e.g. a set of search terms. The search service may process the query by selecting and ranking a set of content items according to a search query. The ranking may determine a scoring or an order of the respective content items relative to the search query, which represents for each of the content items a level of relevance in relation to the respective search query. A search query may also contain parameters for controlling the ranking, like e.g. a ranking query, a boost query and/or a boost function. Furthermore or alternatively, a search service may automatically select one or more heuristics and/or parameters for a search ranking. A search ranking may for example be based on statistics about the search collection and the search terms used for a search. Furthermore, the search ranking may be based on statistics of an occurrence of search terms in specific content items.

For a ranking, e.g. the tf-idf method (term frequency-inverse document frequency) may be used, which is a numerical statistic intended to reflect an importance or relevance of a word for a document in a search collection. Tf-idf values may be used in search service as weighting factors in ranking a document's relevancy relative to a given search query. An tf-idf value increases proportionally to the number of times a word appears in a document and is offset by the frequency of appearance of the word in the search collection.

A search service may manage multiple search indexes, e.g. assigned to multiple tenants. Thus, a search service may be used in a multi-tenant environment e.g. by creating a separate search index for each tenant. In this case, search client services may be required to correctly select the correct index to use for search requests depending on a tenant context.

A search index may be associated with a specific search configuration, consisting of multiple configuration parameters defining settings which control search functionality, behavior and e.g. the structure of the content items in a search index. Search configuration parameters may be updatable and/or changeable via a search service API or by uploading a set of configuration parameter changes, e.g. in form of one or more configuration files, to the search service, a file system or a persistent storage the search service is using.

A learning-to-rank-method or machine-learned ranking method refers to a method using machine learning, e.g., supervised, semi-supervised or reinforcement learning, for constructing ranking models for information retrieval systems and search services. Training data may comprise lists of items with some partial order specified between items in each list. The respective order may be induced by assigning a numerical or ordinal score or a binary judgment, e.g. "relevant" or "not relevant", to each item. A ranking component may be invoked in training mode, passing a training data set and running a machine learning algorithm, which creates a ranking model from the supplied training data. The purpose of a ranking model is to rank search results, which is learned from or "similar" to rankings in the training data. The structure and content of a ranking model may depend on the machine learning method used.

The resulting model may be applied for calculating a ranking of search results.

An example of training data, also referred to as ground truth, may be the following:

"Find X1", PRODUCT-119277, 4, ARTICLE-1560, 3, ARTICLE-1520, 1;

"Find X2", PRODUCT-119034, 4, ARTICLE-1520, 3, ARTICLE-1520, 1;

"Find X3", PRODUCT-118882, 3, PRODUCT-118856, 4, ARTICLE-1099, 2;

"Find X4", PRODUCT-118824, 4, ARTICLE-1507, 3, ARTICLE-1575, 1;

This training data comprises four sample queries and for each sample query three sample 2-tuples content items are provided. "X1", "X2", "X3", and "X4" may e.g. refer to different classes or categories of objects, products or services. Each sample 2-tuples content item comprises a content item identification and a ranking score. For example, in case of the sample query "Find X1" the first sample 2-tuple content item comprises the content item identification "PRODUCT-119277" and the ranking score "4". The third sample 2-tuple content item for this sample query has the content item identification "ARTICLE-1520" and comprises a sample ranking score "1".

A learning-to-rank-method may use the above training data to build a ranking model to calculate numerical ranking scores for content items of search queries. Such calculated numerical ranking scores may be returned as part of responses to the respective search queries. Optionally the search query responses may be ordered according to the ranking scores comprised. A client application may pick the first content item from a search query response to get a top-ranked content item.

The ranking method may be implemented as a ranking component comprised by the search service.

The training data, i.e., ground truth, and ranking model may, e.g., be stored in a database, in a file system, or like. According to embodiments, the training data as well as the ranking model may be provided as content items in the search index or in the content management system.

The quality of a ranking model and ranking results may depend on the quality of the training data. Using inadequate training data for creating a ranking model may result in a low-ranking quality and consequently in a low search quality. Using adequate training data for creating the ranking model on the other hand may result in a high-ranking quality and consequently in a high search quality. Thus, it may be important to ensure good quality of training data, when using a learning-to-rank-method.

According to embodiments, the training data is stored in the content management system. According to embodiments, the training data is stored in the search index of the search service.

The training data may e.g. be created by manually providing sample queries, sample results and sample rankings. Sample queries, sample results and sample rankings may be provided by manually creating or selecting the sample queries and using an interactive tool to pick and reorder sample results assigned to the respective sample search queries in a ranking order.

A headless content management system may be used to support a new programming model for client applications, herein referred to as search-based applications or search-based application programs. Search-based applications rely on a search service to identify and retrieve contents, navigation information, site structures and/or page structures, etc. that is required for the functionality of the respective application. For example, during runtime an application may send a series of search queries to a search service and retrieve information required for rendering the current view of the application from the search responses. In contrast to other programming models, the application may, e.g., not use databases, file systems or other persistency components for managing this information. In order to support the search-based application, the content management system may provide the search service for the search-based application.

Content authors may use the content management system to edit information that is relevant for the search-based applications, like site structures, page structures, navigation structures, and contents, as well as assets, like images, videos, etc. Using this information, content authors may further create new pages, author new content, define new content types and/or define new page types. A modified site may be reviewed, approved, and subsequently published using the content management system. A CMS publishing component used for publishing may index the data in a search service. Therefore, when the publishing is completed, the data may be available to search-based applications through interfaces of the search service.

A search-based application may rely on sending search queries to a search service to retrieve content and the navigation elements to be presented to a user. User interface components may be used for rendering information, like, e.g., page headers and page footers for rendering a page, site maps, trees, menus, or links for rendering the site structure or navigation structure, etc. This way, layout aspects may be separated from the content, site structure and navigation structure.

Embodiments may have the beneficial effect that search queries used by a search-based application are not hard-coded in the application code as defined by an application developer during development of the respective search-based application or provided in a properties file which is part of the respective application. Thus, the search queries of the search-based application are changeable by modifying the application. In order to be able to use modified search queries a user is not required to update or redeploy a modified version of the application comprising the modified search queries on a client device.

According to embodiments, the definition of the user-driven adaptation identifies an original sequence of the navigation elements and a changed sequence of the navigation elements comprising the one or more changes. Embodiments may have the beneficial effect that of providing the ranking training component of the content management system with the user-driven adaptation in an effective way. The ranking training component may use the original sequence of the navigation elements as a starting point to update the training data such that it also represents the changed sequence of the navigation elements. This may comprise updating sample ranking metrics of the training data representing a ranking corresponding to the original sequence of the navigation elements to represent a ranking corresponding to the changed sequence of the navigation elements. According to embodiments, sample search results may further be updated, e.g., in case they represent sequences of navigation elements. Sample search results defining an order for navigation elements comprised, e.g. the original sequence of navigation, may be updated using the changed sequence. For example, the original sequence of navigation elements may be replaced by the changed sequence.

According to embodiments, the definition of the user-driven adaptation further identifies the user performing the user-driven adaptation. Embodiments may have the beneficial effect of enabling an implementation of a personalized adaptation of a ranking of navigation elements. For example, a resulting updated ranking model may be assigned to the respective user identified by a user identifier. The updated ranking model may be used for ranking search results of search queries assigned to the respective user. Alternatively or additionally, one or more user group identifiers may be used identifying groups of users comprising the respective use performing or initiating the user-driven adaptation. In this case, e.g., a resulting updated ranking model may be used for ranking search results of search queries assigned to users of one of the respective user groups.

According to embodiments, the method further comprises determining whether a number of sample search queries comprised by the training data and related to the user-driven adaptation exceeds a predefined threshold. If the respective number of sample search queries does not exceed the predefined threshold, the training data is supplemented with one or more additional sample search queries related to the user-driven adaptation such that the resulting number of sample search queries related to the user-driven adaptation exceeds the predefined threshold, with one or more additional sample search results comprising an additional sample search result for each of the additional sample search queries, and with one or more additional sample ranking metrics comprising an additional sample ranking metric for each of the additional sample search results.

Embodiments may have the beneficial effect of ensuring that the training data comprises sufficient information concerning the user-driven adaptation. In other words, it may be ensured that the user-driven adaptation is sufficiently taken into account for updating the ranking model.

According to embodiments, the predefined threshold is one. Embodiments may have the beneficial effect of ensuring that the training data actually comprises at least one sample search query with a sample search result and a sample ranking metric related to the user-driven adaptation. Thus, it may be ensured that the user-driven adaptation is indeed taken into account for updating the ranking model.

According to embodiments, an initial version of the training data is automatically created by the ranking adaptation component using a set of annotated renderings of application views of one or more client applications, wherein each of the applications' views comprise a plurality of navigation elements. Embodiments may have the beneficial effect providing an initial version of the training data which may be used for calculating an initial version of the ranking model taking into account actual renderings of application views. The application views may be views of the client application for which the ranking model is to be used. According to embodiments, the views may comprise further views of other client applications. Thus, it may be enabled to take over features of over client applications. The annotations may comprise metadata regarding the renderings of the application views to be taken into account for creating the initial version of the training data.

According to embodiments, each of the renderings defines a structure of an application view including a sequence of navigation elements comprised by the respective application views. Embodiments may have the beneficial effect of ensuring that the initial training data takes into account sample sequences of navigation elements which may be used to define an initial version of ranking model. According to embodiments, each of the renderings identifies an assignment of the respective application view to a search query. Embodiments may have the beneficial effect of enabling a simple and effective identification of search queries related to the application views used for creating the initial version of the training data. The assigned search queries may be used as sample search queries for creating an initial version of the set of sample search queries. The renderings of the application views may be used to determine sample search results for creating an initial version of the set of sample search results and sequences of navigation elements defined by the respective renderings may be used for determining sample ranking metrics for creating an initial version of the set of sample ranking metrics.

According to embodiments, the renderings are stored as content items in the content management system. According to embodiments, the renderings may be stored as content items in the search index of the search service. Embodiments may have the beneficial effect of efficiently implementing a storing of renderings, in particular annotated renderings, in the content management system.

According to embodiments, the creating of the initial version of the training data comprises determining an initial set of sample search queries comprising a search query for each of the application views, wherein the search queries of the initial set of sample search queries are identified by search query identifier provided by the renderings of the respective application views. An initial set of sample search results is determined comprising a sample search result for each of the sample search queries of the initial set of sample search queries, wherein each of the sample search results comprises a set of navigation elements identified by the renderings of the respective application views. Furthermore, an initial set of sample ranking metrics is determined comprising a sample ranking metric for each of the sample search results of the initial set of sample search results, wherein each of the sample ranking metrics defines a ranking for the navigation elements comprised by the respective sample search result, wherein the respective ranking represents a sequence of the respective navigation elements defined by the renderings of the respective application views. Embodiments may have the beneficial effect of enabling an efficient and effective creating of the initial version of the training data. Thus, embodiments may not only be used for updating the training data and ranking model, but further for creating an initial version of the training data as well as the ranking model.

According to embodiments, for determining the sample metrics of the initial set of sample metrics furthermore one or more of the following information provided by the renderings, e.g., annotated renderings, of the application views is used: content related features, e.g. tf-idf metrics; associations between content data, e.g., cross-references; content metadata, e.g., creation data; content usage data, e.g., data identifying which content item has been frequently used in a predefined timeframe, like the last 14 days; implicit user feedback on previous search queries, e.g., which of the search results has been used for further activities, such as clicking on, selecting, bookmarking, activating, or purchasing; explicit user feedback, e.g., in form of a rating of a content item, and user created metadata, e.g., tags.

Embodiments may have the beneficial effect that more than only sequences of navigation data defined by renderings of application views may be taken into account for creating an initial version of the training data and an initial version of the ranking model. These initial versions may then be updated taking into account user-driven adaptations of navigation elements.

According to embodiments, the method further comprises calculating by the ranking adaptation component an initial ranking model using the sample ranking metrics of the initial set of sample ranking metrics. Embodiments may have the beneficial effect of not only enabling an updating of a predefined ranking model, but rather a creation of the respective initial ranking model.

According to embodiments, one or more changes of the sequence of the navigation elements result from a rearranging of the respective sequence by a user of the client application performing one or more drag and drop operations. Embodiments may have the beneficial effect of that a user may be enabled to rearrange navigation elements on a user interface displaying an application view of the client application using an input device, like a mouse or a touchscreen. Rearrangement operations may be monitored and the results provided to the content management system. An updating of the ranking model taking into account the rearrangement may result in an amended sequence of navigation elements provided as a result of a next search query issued by the client application for the same user. Thus, the content management system may learn and implement individual ranking preferences of users of the client application.

According to embodiments, the method further comprises executing by the search service a search query. The search service determines a search result of the respective search query comprising a plurality of navigation elements which are ranked by the ranking infrastructure using the ranking model. The search service provides the search result of the respective search query to the client application as a search result for the search query issued by the client application. Embodiments may have the beneficial effect of using the ranking model for ranking navigation elements. In case of an update of the ranking model, the updated ranking model may be used for ranking the navigation elements taking into account user-driven adaptations.

According to embodiments, the search result comprises scores assigned to the navigation elements comprised by the search result, wherein the scores define the ranking of the respective navigation elements according to the ranking model. Embodiments may have the beneficial effect providing the search results with a ranking of the navigation elements that may be used to define a sequence of the respective navigation elements.

According to embodiments, the ranking infrastructure comprises a plurality of ranking models and the search query comprises a reference to one of the ranking models of the plurality of ranking models to be used for ranking search results of the respective search query. Embodiments may have the beneficial effect of incorporating a plurality of ranking models. Search queries may be assigned to specific ranking models. Different ranking models may be used for different types of search queries. For example, personalized ranking models for individual users or groups of users may be provided using a reference of the personalized ranking model. Alternatively, the ranking models may be assigned to user identifiers and/or user group identifiers. These identifiers provided by the search queries may be used for determined a personalized ranking model of the plurality of ranking models to be used for the respective personalized search query. According to embodiments, the method further comprises modifying the search query to use the updated ranking model.

According to embodiments, the search service comprises a set of second search queries. Each of the second search queries is stored as a content item in the search index comprising one or more keywords identifying the respective second search query. A plurality of first search queries comprise a boosting factor referring to one or more of the keywords. The search query executed by the search service is a second search query provided by the search service as a search result of a first search query of the plurality of first search queries issued by the client application and executed by the search service. The respective second search query comprises the one or more keywords referred to by the boosting factor of the respective first search query. The search result provided to the client application as a search result for the search query issued by the client application is a second search result of the respective second search query.

Embodiments may have the beneficial effect that by modifying the second search queries, i.e. the search results of the first search queries, the functionality of the search-based application may be influenced without requiring a code change in the search-based application.

According to embodiments, the search-based application does not contain hardcoded search queries. Instead the search queries to retrieve data used by the search-based application, such as content items, menu items, navigation elements etc., is managed in the content management system. For this purpose, a second search query may be represented as a content item or a set of content items of a specific content type. This allows a content author to use the normal authoring functionality to create and edit second search queries, which are handled like content items by the content management system. The second search queries and/or one or more ranking models used for ranking navigation elements comprised by search results of the second search queries may be modified independently of the code of the search-based application. Using a ranking training component and training data to update a ranking model, user-driven adaptations of the ranking may be implemented without requiring the user to have programming skills or a development environment or code access for changing any search queries. The implementation of user-driven adaptation may rather be implemented automatically.

According to embodiments, a search-based application may implement a web shop including a product catalog. Following a search-based application programming model, the application may issue first search queries to retrieve data for navigation elements, e.g. in form of menu items. In case, it turns out that a menu is not user friendly for an individual user, i.e., does not match a user's needs and/or preference, the respective user may want to improve the sequence of navigation elements, i.e. menu items.

Embodiments allow the user to adapt the search-base application without a need to wait for a developer to update the application code. The user may rather define his or her needs and preferences by changing the respective sequence, e.g., using drag and drop operations. These user-driven adaptations are taken into account by the training component to update the training data resulting in an updated ranking model used for ranking second search results of second search queries. Furthermore, content items representing second search queries for retrieving the navigation elements may be modified. Using an UI control, the user may initiate a creation of personalized versions of second search queries implementing an enhanced ranking and thus improving a sequence of navigation elements. The user-driven adaptations are implemented on the content management system and may thus get effective for all installations of the application on all clients for the respective user, without requiring an update of any application.

The boost factor may ensure that a potential personalized version of the second search query is higher ranked than a non-personalized version, i.e. that a personalized version with an updated ranking of navigation elements may be used rather than a non-personalized version.

According to embodiments, the method further comprises creating and storing a personalized version of the second search query assigned to the user performing the user-driven adaptation. Embodiments may have the beneficial effect of providing personalized search queries resulting in search results optimized for needs and/or preferences of an individual user.

A search-based application program (SBA) retrieves for example content, menu items, navigation elements, such as links to other pages or views, which are to be presented to a user by issuing one or multiple search queries to a search service. The menu items and navigation elements may be represented as content items in a search index and may be managed, i.e. created, read, updated and/or deleted (CRUD), through an authoring service. The search service executes the query and returns a resulting list comprising, e.g., content, menu items, navigation elements to the search-based application program. The result list may be ordered according to a ranking, e.g., computed by the search service or a component comprised by the search service. According to embodiments, the method may use the following search-based application program pattern and method: The search-based application program may use a two-phase search process to retrieve content items, menu items, navigation elements, etc.

In a first phase, the search-based application program may issue a first search query containing, e.g., either an identifier of the search-based application program as well as an identifier of a certain view of the search-based application program or alternatively a query identifier of a second search query, and as part of a boost (sub-)query a user identifier as well as one or more group identifier identifying one or more user groups the user belongs to. This boost query may enable to rank a potential personalized version of the second search query higher than a non-personalized version.

The search index contains a set of content items representing second search queries. These content items contain a representation of a search query in a suitable query syntax, e.g., in Solr query syntax, as well as a set of keywords, used for finding or ranking the content item. These keywords may comprise the query identifier and the search-based application program identifier and search-based application program view identifier and optionally user identifiers and group identifiers. In case the second search query is personalized for one or more users, there may be multiple personalized versions of one second search query for different users and/or user groups. The second search query may be created or modified either automatically or by a content author directly editing the respective content items in the authoring service.

The search service may use a ranking component to rank the search results of the second query. The ranking component may use a learning-to-rank-mechanism which may be implemented using a ranking model trained with training data, i.e., ground truth data. The second search query may contain a reference to a specific ranking model, which is then used for ranking the search results of the second query.

The ranking model may be automatically created by a training process using training data, i.e., ground truth data. The training model may be created by the training process to make optimal use of the information that is contained in the training data, i.e., ground truth data. The training data may be created either manually or automatically from various types of information, i.e., features, that are relevant for a ranking. Features used for ranking may, e.g., be content related features, such as tf-idf metrics; structure of links or associations between content items; content metadata, such as creation data; content usage data, e.g., data identifying which content item was frequently used in the last 14 days; implicit user feedback on previous search queries, e.g. which of the search results was clicked/purchased, etc.; explicit user feedback, e.g. in form of a rating of a content item; user created metadata like tags, etc.

For a ranking, e.g. the tf-idf method (term frequency-inverse document frequency) may be used, which is a numerical statistic intended to reflect an importance or relevance of a word for a document in a search collection. Tf-idf values may be used in search service as weighting factors in ranking a document's relevancy relative to a given search query. An tf-idf value increases proportionally to the number of times a word appears in a document and is offset by the frequency of appearance of the word in the search collection.

There are various formats known for representing training data, i.e., ground truth, for performing training and for applying a ranking model.

Embodiments may have the beneficial effect that the learning to rank method provides a very flexible and powerful mechanism for ranking search results.

The search service finds, ranks and returns a set of second search queries according to the first search query. The content management system may either automatically execute the top-ranked second search query and return search results of the top-ranked second search query or the content management system may return a set of second search queries to the search-base application program, which will then execute the top ranked one. The searched-based application program may use the results of the second search query to render the current view of the searched-based application program. The searched-based application program may rely on the ranking of the search results for selecting or sequencing content items, menu items, navigation elements, etc.

According to embodiments, the computer program product further comprises computer-readable program code configured to implement any of the embodiments of the method for implementing a user-driven adaptation of a ranking of navigation elements of a client application described herein.

According to embodiments, the computer system further is configured to execute any of the embodiments of the method for implementing a user-driven adaptation of a ranking of navigation elements of a client application described herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
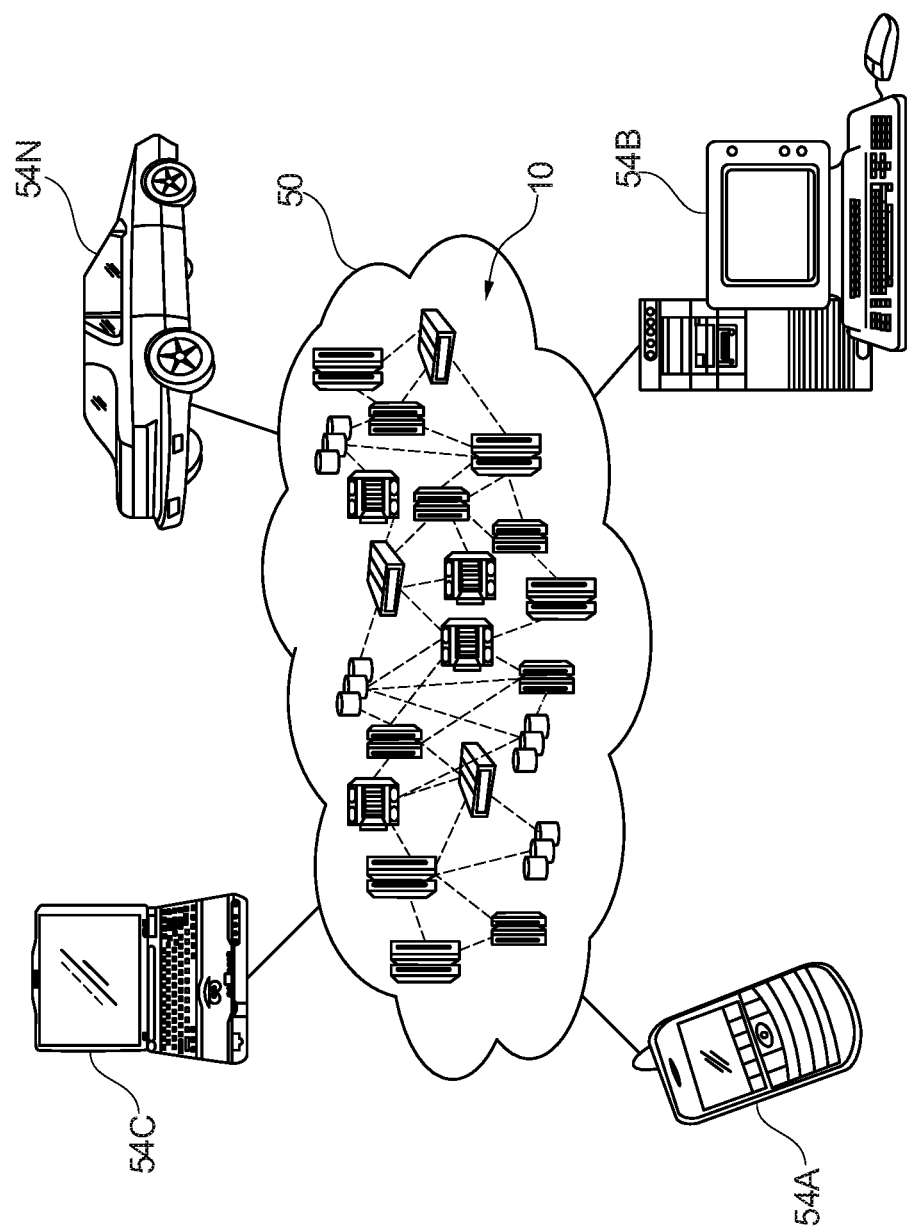
FIG. 2 depicts a schematic diagram illustrating an exemplary cloud computing environment according to an embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
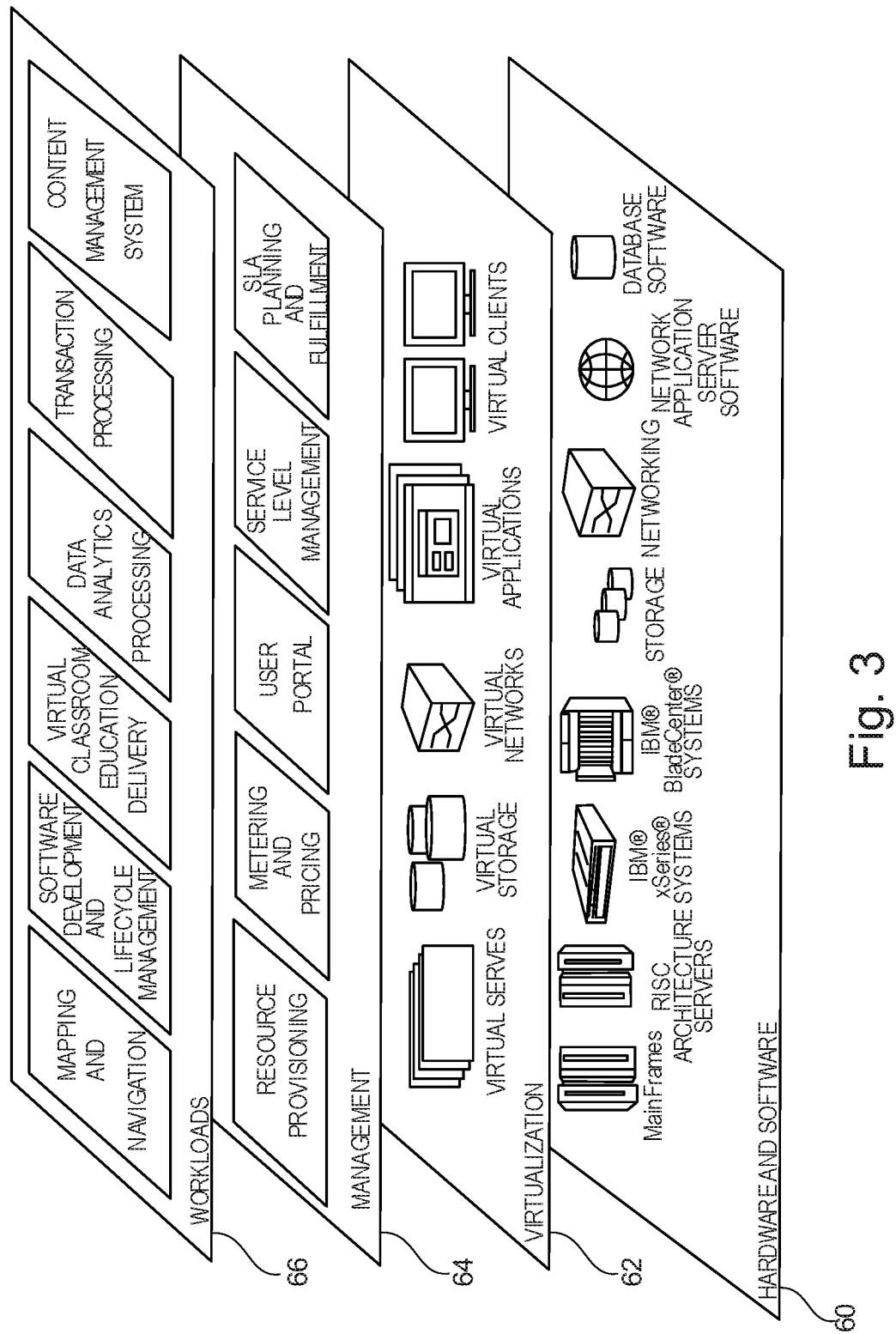
FIG. 3 depicts schematic diagram illustrating exemplary abstraction model layers according to an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. For example, cloud storage locations, e.g. a virtual storage of virtualization layer 62, may be provided. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. For example, the identity of a user trying to access storage locations provided by the cloud infrastructure may be verified. User portal provides access to the cloud computing environment for consumers and system administrators, e.g. access to storage locations provided by the cloud infrastructure. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a search service, e.g., provided as part of a content management system, configured for implementing a user-driven adaptation of a ranking of navigation elements of a client application.

Figure 4:
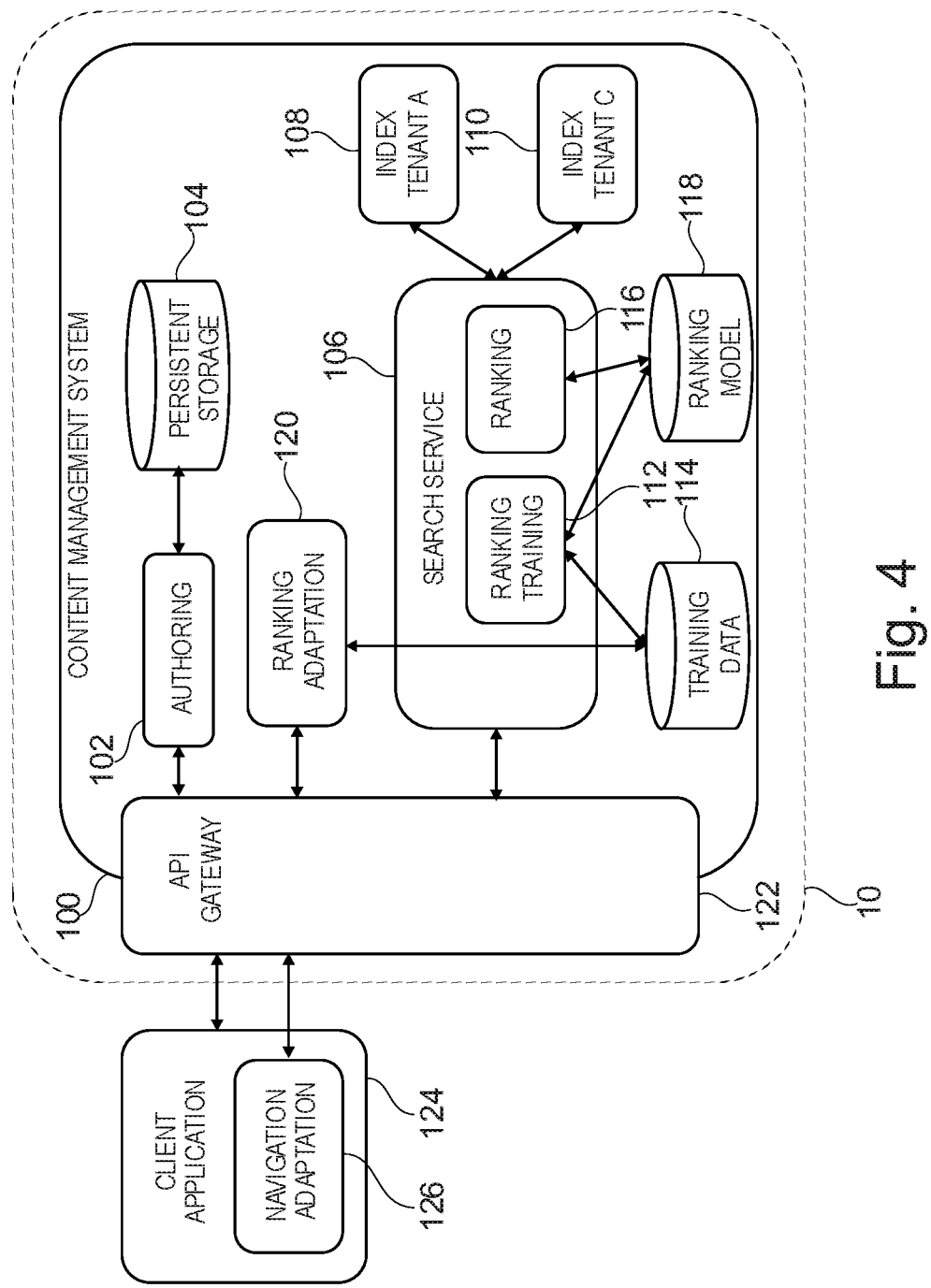
FIG. 4 depicts a schematic diagram illustrating an exemplary system for implementing a user-driven adaptation of a ranking of navigation elements.

FIG. 4 depicts a schematic diagram illustrating an exemplary system for implementing a user-driven adaptation of a ranking of navigation elements. The system may comprise a computer system, e.g. a cloud computing node 10, which provides a content management system 100. The content management system 100 manages digital content items, in particular a creation and modification of digital content items. Digital content items may, e.g., comprised text documents, web pages, images, videos, code scripts, etc. The content management system 100 comprises an authoring component 102 for creating, modifying and editing content items managed by the content management system 100 as well as a persistent storage 104 for storing the content items created, modified and/or edited by the authoring component 102.

The content management system 100 further comprises a search service 106. The search service 106 may provide a search engine, i.e., an information retrieval software program configured for information retrieval and presentation in response to search queries. The search engine is configured for searching one or more search indexes 108, 110 with content items managed by the content management system 100. The search indexes 108, 110 contain representations of data content to be searched. The representation may be configuring to improve processing of search queries. The content items comprised by the search indexes 108, 110 may, e.g., comprise navigation elements. The search indexes 108, 110 may be tenant specific search indexes 108, 110, i.e., assigned to specific tenants. Depending on which tenant requests a search, the search service 106 may select one of the search indexes 108, 110 assigned to the requesting tenant. The search is then executed by the search engine according to the request using the selected search index 108, 110.

The search service 106 further comprises a ranking training component 112 and a ranking component 116. The ranking training component 112 is configured for calculating a ranking model 118 using training data 114 accessible by the ranking training component. The ranking model 118 is used for ranking search results of search queries executed by the search service 106, such as navigation elements. The training data 114 may comprise a set of sample search queries, a set of sample search results for the sample search queries and a set of sample ranking metrics defining a ranking for the sample search results. The content management system 100 further comprises a ranking adaptation component 120 for adapting the training data 114, e.g., sample ranking metrics of the training data 114, using one or more user-driven adaptations of a ranking of the navigation elements.

A client application 124 in form of a search-based application may rely on the search service 106 of the content management system 100 to identify and retrieve contents, navigation information, site structures and/or page structures, etc. that is required for the functionality of the respective client application 124. For example, the client application may send during runtime a series of search queries via an API gateway to the search service 106. The search service 106 executes the search queries using one of the search indexes 108, 110 assigned to the user of the client application 124. The search result may be ranked by the ranking component 116 using the ranking model 118. The search results depending on their ranking may be sent to the client application 124 in response to the search queries issued. For example, a search result ranked highest or search results with a ranking exceeding a predefined threshold may be selected and sent. Thus, the client application 124 is enabled of retrieving information required for rendering an application views from the search results received. Thus, the client application 124 may not require a database, file system or other persistency component for managing on its own.

The client application 124 comprises a navigation adaptation module 126 configured for detecting user-driven adaptations of a ranking of navigation elements. The client application 124 may display an application view using a user display. The application view may comprise multiple navigation elements selected and arranged depending on a ranking. The user may adjust the navigation elements to better match the user's interests, needy and/or preferences. The user may for example rearrange the navigation elements using drag and drop operations. The respective user-driven adaptations are detected by the navigation adaptation module 126 and provided via the API gateway 122 to the ranking adaptation component 120. The ranking adaptation component 120 update the training data 114 such that the training data 114 comprises sample ranking metrics and/or sample search results representing a ranking of navigation elements in accordance to the user-driven adaptations. The updated training data 114 is used by the ranking training component 112 to calculate an updated ranking model 118. Thus, when executing further search queries issued by the client application 124, the ranking component 116 will use the updated ranking model 118 which takes into account the user-driven adaptations of the ranking of navigation elements. Thus, the user is enabled to adjust the ranking of navigation elements according to individual interests, needy and/or preferences without being required to change the code of the client allocation or executing any other programming tasks.

Figure 5:
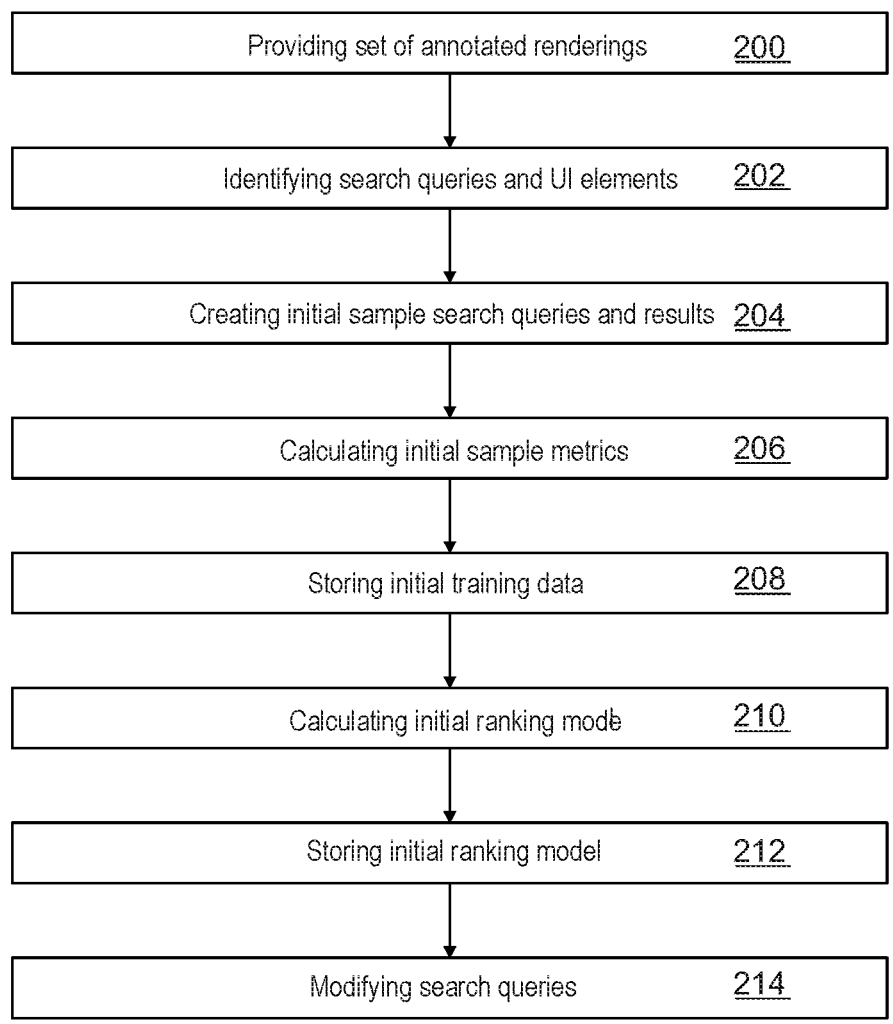
FIG. 5 depicts a schematic flow diagram of an exemplary method for creating training data.

FIG. 5 depicts a schematic flow diagram of an exemplary method for creating training data. In an initial phase an initial version of training data may automatically be created from a set of annotated renderings of various application views. In block 200, the set of annotated renderings of the application views of a search-based application. The renderings may have been previously created, e.g., by a designer and may be represented as a set of HTML files, e.g., edited interactively using a HTML editor. These renderings define the details like, e.g. position, size, format, etc., of each user interface element for each application view. Thus, a sequence of UI elements may be derivable from the respective renderings. In block 202, for each of the rendered application view at least one search query is identified by the ranking adaption component. The ranking adaptation component may be invoked and retrieve the respective set of application view renderings for the search-based application via the authoring component from the persistent storage. Each application view may be assigned to least one search query. The respective assignment may be represented in the rendering, e.g., by including the search query identifier as additional data in the HTML document. The renderings may be stored as content items of a specific content type in the content management system and retrieved from an authoring service. Each of these content items may contain the application identifier of the search-based application and the corresponding application view. The UI elements may each comprise a UI element identifier, such as "MENU~1" or "LINK~2", that references a content item of the respective content type stored in the content management system. For each rendering the ranking adaptation component may parse the markup document and identify on or more query identifiers and a set of UI elements of this application view.

In block 204, the ranking adaptation component creates at least one item in the training data for each of the identified search queries containing a search query identifier of the respective search query and a set of sample search results of the set of identifiers of UI element of this application view. In block 206, the ranking adaptation component further calculates ranking metrics for the sample search results. The set of UI elements may be sorted according to sequences of the UI elements in the application views. The ranking metrics may provide a sample ranking score for each of the sample results. The score may depend on the position of the respective UI element in the sequence. For example, the first UI element may be assigned with a score of "10", the second UI element with a score of "8", the third UI element with a score "6", etc. In block 208, the ranking adaptation component stores the resulting initial training data, i.e., initial ground truth. In block 210, the ranking training component, e.g. invoked by the ranking adaptation component, calculates an initial ranking model using the initial training data. In block 212, the initial ranking model is stored, e.g. by the ranking adaption component. In block 214, the ranking adaptation component may modify a set of search queries stored in the content management system to reference and/or use the updated ranking model resulting from the ranking training. In order to include further features or aspects, like, e.g., rating of a linked content item, in the ranking an administrator or user may manually or by using other mechanisms update or extend the training data and then train an updated version of the ranking model.

Figure 6:
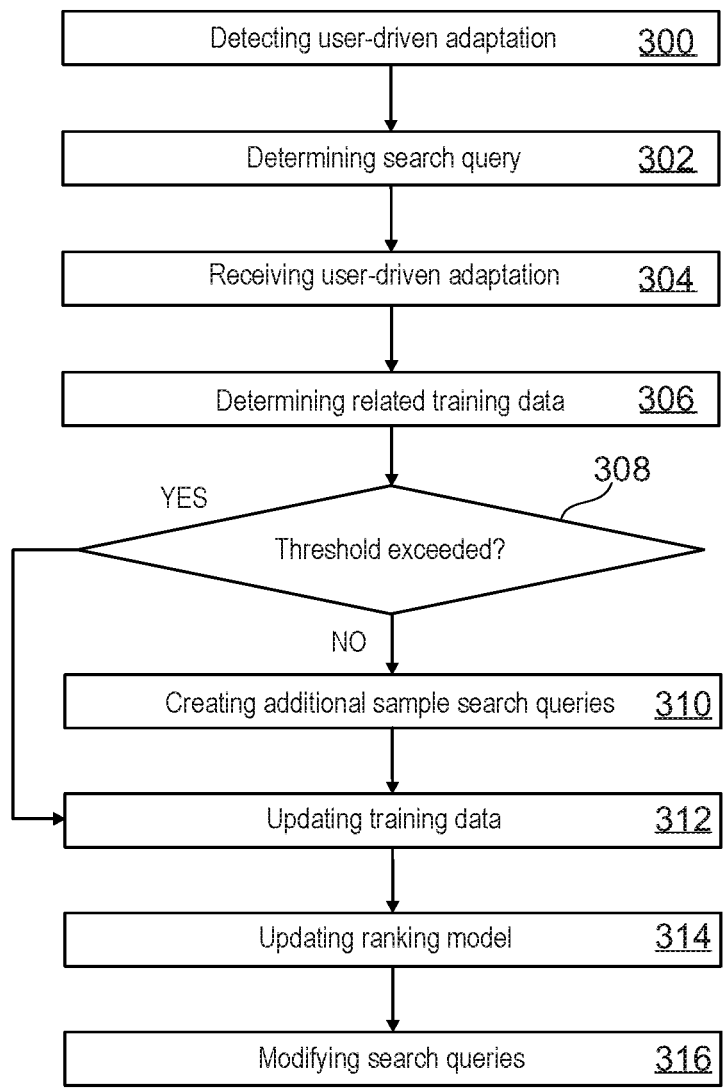
FIG. 6 depicts a schematic flow diagram of an exemplary method for implementing a user-driven adaptation of a ranking of navigation elements, and FIG. 7 depict schematic diagrams illustrating exemplary training data.

FIG. 6 depicts a schematic flow diagram of an exemplary method for automatically checking search configurations. The training data is automatically updated based on a user-driven adaptation, such as user's drag and drop operations to rearrange navigation elements. In block 300, the navigation adaptation component (NAC) of the client application detects a user-driven adaptation of a ranking of navigation elements. The navigation adaptation component may comprise a user interface to drag and drop navigation elements. When a user drags and drops a navigation element, the navigation adaptation component may determine the original sequence of navigation elements and the amended sequence resulting from the drag and drop operation. A user may for example change a sequence of two navigation elements, such as menu items, i.e., switching the order of the respective items. In block 302, the navigation adaptation component further determines a search query which was used by the search-based application program to retrieve the original sequence of navigation elements. The retrieving operation may be implemented including the query identifier of the respective search query in the representation of the navigation element. The search service may automatically include the respective identifier in the search result. In this case, the navigation adaptation component may take the identifier from the search result. The navigation adaptation component may, e.g., determine a query identifier of a search query, such as "search-query-page-001".

In block 304, the ranking adaptation component of the content management service receives a definition of the detected user-driven adaptation from the navigation adaptation component. The navigation adaptation component may, e.g., invoke the ranking adaptation component through the API Gateway and pass the search query and both the original as well as the amended sequence of navigation elements to the ranking adaptation component. Optionally, the definition of the user-driven adaptation may further comprise a user identifier of the user performing the adaptation. In what follows the ranking adaptation component may change the ranking model, i.e., ranking parameters, to represent the amended sequence of search results, i.e., navigation elements, for the given search query. For example, data passed to the navigation adaptation component may comprise a query identifier of the search query "search-query-page-001", an original sequence of navigation elements ("MENU~119277", "MENU~1560", "MENU~1520", "LINK~1521") as well as an amended sequence of navigation elements ("MENU~1520", "MENU~1560", "MENU~119277", "LINK~1521").

In block 306, the ranking adaptation component determines sample queries included in the training data which are related to the respective adaptations as well as related sample search query results including ranking metrics assigned to the respective search query results. Related sample queries may, e.g. be determined using query identifiers provided by the navigation adaptation component as part of the definition of the user driven adaptation. FIG. 7A depicts exemplary training data 130 before an update based on the user-driven adaptation. The training data 130 comprises three sample queries identified by query identifier "search-query-page-001", "search-query-page-002", and "search-query-page-003". Further, the training data 130 comprises sample search results for each of the sample queries with navigation elements in form of menu items "MENU" and links "LINK". Each navigation element is identified by a navigation element identifier and assigned with a sample ranking metric, providing a score for the ranking of the respective navigation element. In this example the training data may already comprise a sample query with query identifier "search-query-page-001" and a set of sample navigation elements with a sample ranking metric, i.e., "search-query-page-001, MENU~119277, 10, MENU~1560, 9, MENU~1520, 8, LINK~1521, 7".

In block 308, the navigation adaptation component checks if the number of determined sample queries lies above a predefined threshold. If this is not the case, the navigation adaptation component may automatically create an amended set of sample queries including a set of sample search results corresponding to the amended sequence of navigation elements. For example, the set of sample search results may be created such that it comprises identifiers of the content items representing the respective navigation elements. In case there was no sample for the given search query, in step 310, the navigation adaptation component may create an additional sample query of the form: "search-query-page-001, MENU~1520, 10, MENU~1560, 9, MENU~119277, 8, LINK~1521, 7".

In block 312, the ranking adaptation component updates the training data. For each of the sample search queries the ranking adaptation component may recalculate the set of sample results and sample ranking metrics using the amended sequence of navigation elements resulting in an updated ranking metrics and updating training data accordingly. The updated training data may be stored either in the content management system, e.g., by invoking a CRUD operation of the authoring service, or in the search index. For example, the navigation adaptation component may select the ranking metrics according to the amended sequence of navigation elements, starting with a predefined value, like, e.g., "10": "search-query-page-001, MENU~1520,10, MENU~1560, 9, MENU~119277, 8, LINK~1521, 7".

In block 314, the ranking training component, e.g., invoked by the ranking adaptation component, calculates an updated ranking model using the updated training data and stores the resulting updated ranking model either in the content management system, e.g., by invoking a CRUD operation of the authoring service, or in the search index. FIG. 7B depicts exemplary training data 130 after an update based on the user-driven adaptation. In sample search query "search-query-page-001" the ranking of the search results has been updated from "MENU~119277=10, MENU~1560=9, MENU~1520=8, LINK~1521=7" of FIG. 7A to "MENU~1520=20, MENU~119277=10, MENU~1560=9, LINK~1521=7" of FIG. 7B based on the user-driven adaptation provided by the navigation adaptation component.

In block 316, the ranking adaptation component modifies a set of search queries to use the updated ranking models resulting from the ranking training. For example, one search query may be modified, i.e., the search query corresponding to query identifier "search-query-page-001". In another embodiment, a modified search query is created and associated with a user identifier ("userid") of a user performing the drag and drop operation. The system may create the modified search query "search-query-page-001-userid" to use the updated ranking model. The modified search queries may be stored in the content management system or in the search-based application program for further use, e.g. as second search queries. Thus, modified search queries are provided for retrieving navigation elements in future. Embodiments may exploit one or more of the following advantages of a search engine: A ranking feature which allows to create a ranking of a set of content items according to a model trained from automatically managed ground truth representing user adaptations. This may allow a client application program to rely on the search service to always return navigation elements in a ranking order which matches the user preferences. The client application program may therefore not be required to implement custom logic to reorder or recalculate the relevance of multiple returned content items.

It is understood that one or more of the aforementioned embodiments of the invention may be combined as long as the combined embodiments are not mutually exclusive. Ordinal numbers, like e.g. 'first' and 'second', are used herein to indicate different element assigned with the same name, but do not necessarily establish any order of the respective elements.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for a user-driven adaptation of a ranking of navigation elements of a client application, the method comprising the steps of:
receiving, by one or more computer processors, a definition of a one or more user-driven adaptation, wherein the definition of the user-driven adaptation identifies one or more changes of a sequence of navigation elements performed by a user of a client application, wherein the navigation elements are provided for use by the client application as part of a search results in reply to a search queries issued by the client application, wherein the search results further each define a sequence of the navigation elements comprised by the respective search result depending on a ranking of the navigation elements, wherein a search service is provided with a search engine for executing the search queries issued by the client application using a search index with content items, wherein the content items comprise the navigation elements;

determining, by one or more computer processors, one or more sample ranking metrics assigned to sample search results of sample search queries related to the received user-driven adaptation of a ranking of the navigation elements using a training data, wherein the training data comprises a set of sample search queries, a set of sample search results comprising a sample search result for each of the sample search queries, and a set of sample ranking metrics comprising a sample ranking metric for each of a sample search results, each sample ranking metric defining a ranking for the respective sample search result, and wherein an initial version of the training data is applications views comprises a plurality of navigation elements;

Updating, by one or more computer processors, the determined sample ranking metrics, wherein the updating comprises calculating updated ranking metrics using the changes of the sequence of the navigation elements;

Updating, by one or more computer processors, the training data with the updated ranking metrics; and Invoking, by one or more computer processors, the ranking training component to calculate an updated ranking model using the updated ranking metrics.

2. The computer-implemented method of claim 1, wherein the navigation elements are managed by a content management system comprising the search service and managing the content items of the search index, wherein the content management system further comprises the ranking adaptation component.

3. The computer-implemented method of claim 1, wherein the definition of the user-driven adaptation identifies an original sequence of the navigation elements and a changed sequence of the navigation elements comprising the one or more changes.

4. The computer-implemented method of claim 3, wherein the definition of the user-driven adaptation further identifies the user performing the user-driven adaptation.

5. The computer-implemented method of claim 1, wherein the method further comprises:

determining, by one or more computer processors, whether a number of sample search queries comprised by the training data and related to the user-driven adaptation exceeds a predefined threshold;

in response to the respective number of sample search queries not exceeding the predefined threshold, supplementing, by one or more computer processors, the training data with one or more additional sample search queries related to the user-driven adaptation such that the resulting number of sample search queries related to the user-driven adaptation exceeds the predefined threshold, with one or more additional sample search results comprising an additional sample search result for each of the one or more additional sample search queries, and with one or more additional sample ranking metrics comprising an additional sample ranking metric for each of the additional sample search results.

6. The computer-implemented method of claim 1, wherein each of the renderings defines a structure of an application view including a sequence of navigation elements comprised by the respective application views.

7. The computer-implemented method of claim 1, wherein each of the renderings identifies an assignment of the respective application view to a search query.

8. The computer-implemented method of claim 1, wherein the creating of the initial version of the training data comprises:

determining, by one or more computer processors, an initial set of sample search queries comprising a search query for each of the application views, wherein the search queries of the initial set of sample search queries are identified by search query identifier provided by a renderings of the respective application views;

determining, by one or more computer processors, an initial set of sample search results comprising a sample search result for each of the sample search queries of the initial set of sample search queries, wherein each of the sample search results comprises a set of navigation elements identified by the renderings of the respective application views; and determining, by one or more computer processors, an initial set of sample ranking metrics comprising a sample ranking metric for each of the sample search results of the initial set of sample search results, wherein each of the sample ranking metrics defines a ranking for the navigation elements comprised by the respective sample search result, wherein the respective ranking represents a sequence of the respective navigation elements defined by the renderings of the respective application views.

9. The computer-implemented method of claim 8, wherein for determining the sample metrics of the initial set of sample metrics furthermore includes using one or more of the following information provided by the renderings of the application views: content related features, associations between content data, content metadata, content usage data, implicit feedback by the user, explicit feedback by the user, and metadata created by the user.

10. The computer-implemented method of claim 8, wherein the method further comprises calculating, by one or more computer processors, an initial ranking model using the sample ranking metrics of the initial set of sample ranking metrics.

11. The computer-implemented method of claim 8, wherein the one or more changes of the sequence of the navigation elements result from a rearranging of the respective sequence by a user of the client application performing one or more drag and drop operations.

12. The computer-implemented method of claim 1, wherein the method further comprises:

executing, by one or more computer processors, a search query;

determining, by one or more computer processors, a search result of the respective search query comprising a plurality of navigation elements which are ranked by the ranking infrastructure using the ranking model, providing, by one or more computer processors, the search result of the respective search query to the client application as a search result for the search query issued by the client application.

13. The computer-implemented method of claim 12, wherein the search result comprises scores assigned to the navigation elements comprised by the search result, wherein the scores define the ranking of the respective navigation elements according to the ranking model.

14. The computer-implemented method of claim 12, wherein the ranking infrastructure comprises a plurality of ranking models and the search query comprises a reference to one of the ranking models of the plurality of ranking models to be used for ranking search results of the respective search query.

15. The computer-implemented method of claim 12, wherein the method further comprises modifying the search query to use the updated ranking model.

16. The computer-implemented method of claim 12, wherein the search service comprises a set of second search queries, wherein each of the second search queries is stored as a content item in the search index comprising one or more keywords identifying the respective second search query, wherein a plurality of first search queries comprise a boosting factor referring to one or more of the keywords,
   wherein the search query executed by the search service is a second search query provided by the search service as a search result of a first search query of the plurality of first search queries issued by the client application and executed by the search service, wherein the respective second search query comprises the one or more keywords referred to by the boosting factor of the respective first search query;
   wherein the search result provided to the client application as the search result for the search query issued by the client application is a second search result of the respective second search query.

17. The computer-implemented method of claim 16, wherein the method further comprises creating and storing a personalized version of the second search query assigned to the user performing the user-driven adaptation.

18. A computer program product for a user-driven adaptation of a ranking of navigation elements of a client application, the computer program product comprising:
   one or more computer readable storage media; and
   program instructions stored on the one or more computer readable storage media, the program instructions comprising:
   program instructions to receive a definition of a one or more user-driven adaptation, wherein the definition of the user-driven adaptation identifies one or more changes of a sequence of navigation elements performed by a user of a client application, wherein the navigation elements are provided for use by the client application as part of a search results in reply to a search queries issued by the client application, wherein the search results further each define a sequence of the navigation elements comprised by the respective search result depending on a ranking of the navigation elements, wherein a search service is provided with a search engine for executing the search queries issued by the client application using a search index with content items, wherein the content items comprise the navigation elements;
   program instructions to determine one or more sample ranking metrics assigned to sample search results of sample search queries related to the received user-driven adaptation of a ranking of the navigation elements using a training data, wherein the training data comprises a set of sample search queries, a set of sample search results comprising a sample search result for each of the sample search queries, and a set of sample ranking metrics comprising a sample ranking metric for each of a sample search results, each sample ranking metric defining a ranking for the respective sample search result, and wherein an initial version of the training data is automatically created by the ranking adaptation component using a set of annotated renderings of application views of one or more client applications, wherein each of the applications views comprises a plurality of navigation elements;
   program instructions to update the determined sample ranking metrics, wherein the updating comprises calculating updated ranking metrics using the changes of the sequence of the navigation elements;
   program instructions to update the training data with the updated ranking metrics; and
   program instructions to invoke the ranking training component to calculate an updated ranking model using the updated ranking metrics.

19. A computer system for a user-driven adaptation of a ranking of navigation elements of a client application, the computer system comprising:
   one or more computer processors;
   one or more computer readable storage media; and
   program instructions stored on the one or more computer readable storage media for execution by at least one of the one or more computer processors, the program instructions comprising:
   program instructions to receive a definition of a one or more user-driven adaptation, wherein the definition of the user-driven adaptation identifies one or more changes of a sequence of navigation elements performed by a user of a client application, wherein the navigation elements are provided for use by the client application as part of a search results in reply to a search queries issued by the client application, wherein the search results further each define a sequence of the navigation elements comprised by the respective search result depending on a ranking of the navigation elements, wherein a search service is provided with a search engine for executing the search queries issued by the client application using a search index with content items, wherein the content items comprise the navigation elements;
   program instructions to determine one or more sample ranking metrics assigned to sample search results of sample search queries related to the received user-driven adaptation of a ranking of the navigation elements using a training data, wherein the training data comprises a set of sample search queries, a set of sample search results comprising a sample search result for each of the sample search queries, and a set of sample ranking metrics comprising a sample ranking metric for each of a sample search results, each sample ranking metric defining a ranking for the respective sample search result, and wherein an initial version of the training data is automatically created by the ranking adaptation component using a set of annotated renderings of application views of one or more client applications, wherein each of the applications views comprises a plurality of navigation elements;
   program instructions to update the determined sample ranking metrics, wherein the updating comprises calculating updated ranking metrics using the changes of the sequence of the navigation elements;
   program instructions to update the training data with the updated ranking metrics; and
   program instructions to invoke the ranking training component to calculate an updated ranking model using the updated ranking metrics.

* * * * *